United States Patent [19]

Tallard

[11] Patent Number: 4,726,713

[45] Date of Patent: Feb. 23, 1988

[54] SELF-HARDENING SLURRY MIX

[76] Inventor: Gilbert R. Tallard, 128 Corlies Ave., Pelham, N.Y. 10803

[21] Appl. No.: 874,684

[22] Filed: Jun. 16, 1986

[51] Int. Cl.$^4$ .............................................. E02D 27/00
[52] U.S. Cl. .................................... 405/267; 106/117
[58] Field of Search ...................... 106/117; 405/267

[56] References Cited

U.S. PATENT DOCUMENTS 4,095,988  6/1978  Jancek et al. ......................... 106/97
4,514,228  4/1985  Gouvenot ............................. 106/98

FOREIGN PATENT DOCUMENTS 245629  10/1969  U.S.S.R. ............................. 106/117

OTHER PUBLICATIONS

Hackh's Chemical Dictionary, 4th Ed., (1969), pp. 70, 437, 438.

Primary Examiner—Steven Capella
Attorney, Agent, or Firm—Larson and Taylor

[57] ABSTRACT

An improved stable, clay/cementitious composition comprised of 15%–55% Attapulgite clay and 85%–45% slag cement particularly useful in the construction of very low permeability, self-hardening slurry trench cutoff walls, has been discovered. The aqueous slurries of the invention exhibit (1) an initial viscosity controllable without the addition of chemical, (2) lower filtrate loss and (3) chemical resistance, (4) lower permeability on curing, and (5) expedient handling.

6 Claims, No Drawings

SELF-HARDENING SLURRY MIX

FIELD OF THE INVENTION

The invention relates to stable, clay cementitious compositions. More particularly, the invention concerns improvements in clay/cementitious compositions useful particularly in the construction of seepage barriers or walls.

BACKGROUND OF THE INVENTION

In the field of underground construction of seepage barriers, clay/cement suspensions are used either by injecting them into the ground through grout holes or applying them as a slurry between the walls of vertical trenches and allowing them to set in place so as to form relatively impervious barriers. These techniques are used to contain groundwater when an impoundment is created or to contain contaminated groundwater or leachates of industrial and sanitary origins. Chronologically, stable slurries were first developed in the area of grouting before attention was directed to the application of slurries for trenched cutoff wall construction. Caron et al describe the latter method in U.S. Pat. No. 3,759,044 wherein panelized trench excavation is employed using clamshell equipment. In today's state of the art, hydraulic excavators are used for trenching down to 70 feet and a combination of both a hydraulic excavator and clamshell are used to construct deeper trenches built in a continuous manner and without distinct panelization.

Heretofore, the clay/cement slurries employed in the construction of these barriers have been aqueous slurries of bentonite and Portland cement. Bentonite must be hydrated with clean fresh water prior to the introduction of the cement which establishes a first constraint since the job site must have available the proper quality of water. Further, any contact with even minute quantities of Portland cement will contaminate the bentonite during its hydration and affect the characteristics of the bentonite slurry in a detrimental manner (floculation and filtrate loss). For this reason, bentonite and cement as dry materials must be stored carefully and away from each other and separate mixers are generally used for the hydration of the bentonite and for the subsequent addition of cement. Chemical additives are often used in an attempt to mitigate against these adverse factors but always at a premium.

Since slurry trenched cutoff walls do not require structural strength, the main characteristic of the end product is its permeability. Tested under standard procedures, such cutoff wall permeabilities range between $10^{-5}$ and $10^{-6}$ cm/sec. A second characteristic which bears on economics as well as on the properties of the final product, is the filtrate loss or the ability of the cement bentonite slurry to release water by filtration through the walls of the trench until the set has taken place. Depending on the cement/bentonite formulation and the chemical additives used, the A.P.I. standard test will give a filtrate of 130 to 250 cc. This is to be compared with the filtrate loss of pure bentonite slurry which will vary between 12.5 to 30 cc.

The rheology of the cement/bentonite system must be such that in a fresh state the slurry permits the performance of the trench excavation in good conditions by remaining stable, having a viscosity such that solids removed from the ground and not spoiled by the trenching equipment will remain dispersed in suspension, and not setting before a particular section of trench is fully excavated. These characteristics generally require minute quantities of chemical additives either organic or mineral but their cost is significant.

In the United States, the bentonite used is a sodium montmorillonite originating from Wyoming or South Dakota and the Portland cement is a Portland cement type I, II or III and eventually type IV. Although these materials can be used for impounding uncontaminated groundwater, care must be given when the intended application is the impounding of waste substances. Montmorillonite, in its hydrated form, has a plate structure where possible ion exchanges can result in the collapse of the plate structure thus causing the shrinkage of the clay. An increase in permeability can result. Its use is more a matter of derivation of technology inherited from the oil drilling industry and a matter of convenience, given its commercial availability, than the resulting of a scientific selection.

Portland cement in bentonite/cement slurries satisfies most normal uses in natural groundwater seepage control and also many cases of waste containment, particularly hydrocarbons. However, very low pH mediums can be detrimental to the cement in a cement/bentonite composition although to a lesser degree than would be in the case of a concrete. Free lime may become a source of increased permeability of the cement/bentonite if allowed to leach out over the long term. The problems with Portland cement are also of a practical nature: the phenomenon of false set creates a sudden rise in viscosity that must be countered with energetic mixing until the mix returns to an acceptable viscosity. When lower permeabilities must be achieved, a high proportion of cement must be used with the eventual addition of mineral fillers, thus creating serious difficulties in maintaining a workable viscosity and sufficient time for trenching before set. In the latter case, both fluidifiers and retarders are used systematically. Consequently, the cost for materials for achieving a permeability in the range of $10^{-6}$ to $10^{-7}$ cm/sec can be double the one required for the range between $10^{-5}$ and $10^{-6}$ cm/sec.

U.S. regulatory agencies and engineering bodies involved with environmental protection have determined and established as a minimum performance criterion of imperviousness for clay liners and barriers (which includes all forms of slurry trenched cutoffs) a coefficient of $10^{-7}$ cm/sec. Therefore, as discussed above, the performance of cement/bentonite slurry trenches is generally substandard and restricts significantly the possible use of self-hardening cement/bentonite slurries for toxic and hazardous waste containment applications. Needless to say, a real need exists for a clay/cement composition which remedies this situation and provides construction simplifications that results in considerable savings.

OBJECTS OF THE INVENTION

Accordingly, it is an object of this invention to provide a simple clay/cement combination that provides a hardened slurry having a significantly lower permeability.

Another object of the invention is to provide a clay/cement mixture whose individual components are neutral in a dry form and can therefore be delivered pre-proportioned and premixed to form a single dry blend that can be mixed with water to prepare the slurry.

Yet another object of the invention is to provide clay/cement slurries whose viscosity is controllable without the addition of chemicals.

A further object of the invention is to provide a clay/cement composition that will hydrate in brackish or saline waters as well as fresh water.

Another object of the invention is to provide a dry blend of clay and cement ingredients that offers upon hydration and curing a higher chemical resistance than prior art clay/cement compositions.

Yet another object of the invention is to provide a clay/cement blend that in a slurry form presents a lower filtrate loss than the cement/bentonite slurries of the prior art.

Still another object of the invention is to provide a clay/cement slurry that in the proportion required to achieve a permeability lower than $10^{-7}$cm/sec. represents an overall savings in materials in addition to the operational savings due to the simplicity of the preparation proces at the project site.

SUMMARY OF THE INVENTION

These and other objects of the invention are obtained by a dry blend capable of forming a self-hardening mass when reacted with an aqueous component comprising about 15 to 50% by weight of Attapulgite clay and about 85 to 45% by weight of slag cement. Preferably the dry blends of the invention comprise about 30 to 45% by weight Attapulgite clay and about 70 to 55% by weight slag cement. The preferred aqueous slurries of the invention are those having a viscosity of about 35 to 60 Marsh-cone seconds. Particuarly preferred are aqueous slurries composing water and in a proportion by weight of said water of about 5 to 8% of Attapulgite clay and about 7.5 to 15% of slag cement.

DETAILED DESCRIPTION OF THE INVENTION

The Attapulgite clay component of the blend of the present invention is found in the United States in southwest Georgia and northwest Florida. The needle stack nature of the crystalline structure of this clay has been found to be highly desirable for optimal combination with slag cement which has similar crystalline structure after hydration. This needle crystalline characteristic of the Attapulgite clay explains two favorable features of this clay that contribute to this invention: (1) the viscosity developed by an Attapulgite clay mud is directly related to the shearing energy provided in the mixing process, which provides a clay/cement composition with a mechanical means of regulating the viscosity of the mix without use of chemicals and (2) the low ion exchange capability of this clay combined with its structure by opposition to plate stack type clays like bentonites give Attapulgite a particular resistance to chemicals.

The slag cement component of the invention is that obtained from milling certain metallurgical wastes (slag) in pure form. It differs significantly in both physical and chemical properties from Portland cement and in the compositions of the invention offers unexpected advantages thereover. For example, in self-hardening slurries where the water/cement ratio is between 10 and 15, slag in its pure form performs drastically differently from a Portland cement. In the first seven days the strength gain of the slag mix is many fold that of the same proportion of Portland cement mix and in conjunction with this strength buildup the permeability of the slag mix is ultimately one or two order of magnitude lower than the Portland cement mix. Also, the slag mix is exempt from the false set phenomenon occuring with Portland cement and therefore the rheology of the slag mix is more predictable. In addition, compositions of the invention containing slag cement exhibit lower permeability after curing than those containing Portland cement. Pure slag cement with a Blaine surface area of 6,000cm$^2$/gr. is available commercially in the United States and Canada.

Attapulgite clay and slag cement do not react in a dry form and can be pre-proportioned, blended and packaged in the manufacturing plant and stored prior to shipment to a construction site as one product. In order to satisfy a specific chemical resistance aspect of a particular design, chemical additives may be added to the blend at this point. This possibility permits a substantial simplification of the plant set up in the field where the blend of the invention requires the addition of almost any kind of water in the required proportion and mixing in a high shear colloidal mixing apparatus to produce with time the desired initial viscosity of the self-hardening slurry: savings on the plant, labor and energy are achieved by comparison to a conventional cement bentonite slurry setup. Therefore, on top of much better performance of compositions of the invention over Portland cement/bentonite blends from a permeability and chemical resistance standpoint, a substantial operational cost saving is possible.

Since the Attapulgite clay and slag cement components of the invention are in dry powder form and neutral to each other, they can be pre-mixed to form a dry formulation comprising about 10 to 55% by weight Attapulgite clay and about 85 to 45% by weight slag cement. The preferred composition comprises about 30 to 45% by weight Attapulgite clay and about 70 to 55% by weight slag cement. If desired, dry chemical additives can be incorporated to satisfy specific requirements.

The volume of water provided the dry blends of the invention to form aqueous slurries will vary depending upon the proportions of clay and slag cement selected and the intended use of the slurry. Generally, a water to dry blend ratio by weight of at least 7 is necessary to form a manageable slurry, i.e. a slurry which is not too thin or too thick. In the case of self-hardening slurries of the invention sufficient water is used to provide a slurry having a viscosity of about 35 to 60 Marsh-cone seconds. Normally, self-hardening slurries of the invention comprise water and in a proportion by weight of said water of about 5 to 8% of Attapulgite clay and about 7.5 to 15% of slag cement. Such aqueous slurries after reaching in a fluid form a viscosity of 25 centipoises exhibit a bleeding of free water less than 5% and ultimately set into a solid of low mechanical characteristics that is very impervious and resistant to chemical attack. Ordinarily, after 28 days of curing time the compositions of the invention incorporating at least 12% of slag cement by weight of water, exhibit a coefficient of permeability of less than $10^{-7}$cm/sec For slurry trenching purposes the chosen initial viscosity (35 to 60 Marsh-cone seconds) is obtained mechanically using a high shear mixing apparatus capable of developing the colloidal properties of the Attapulgite clay. The higher the viscosity, the more stable the slurry. The optimum initial viscosity can be varied from one application to another.

In a preferred mixing procedure, the dry blend of Attapulgite clay and slag cement is first mixed with a portion, preferably of 50 to 75% volume of the total volume of water predetermined to give the targeted initial viscosity and then adding the remainder of the water. This mixing technique has been found to reduce significantly the mixing time and save energy.

The following Examples illustrate preferred embodiments of the present invention the should not be construed in a limiting sense. By these examples it is demonstrated that a minimum of 12% of slag cement by weight of water is required to achieve permeabilities of less than $10^{-7}$ cm/sec.

EXAMPLE I 80 grams of Attapulgite were blended with 80 grams of slag cement. This dry blend was added to 660 grams of water and thoroughly mixed for 3.5 minutes. 340 grams of water was then added and mixed for 1 minute. The slurry thus produced exhibited a viscosity of 57 Marsh-cone seconds. Free water after set was about 3%. After a curing period of 120 days at room temperature the permeability coefficient was $k=4.8\times10^{-6}$ cm/sec.

EXAMPLE II 60 grams of Attapulgite was blended with 100 grams of slag-cement. This dry blend was added to 660 grams of water and thoroughly mixed for 4 minutes. 340 grams of water was then added and mixed for 1 minute. The slurry produced exhibited a visocity of 45 Marsh-cone seconds.

EXAMPLE III

In a low speed mixer, 60 grams of Attapulgite clay was blended with 120 grams of slag cement. The dry blend was then added to one thousand (1000) grams of water and the components were thoroughly mixed in a high shear mixing apparatus. The resulting slurry, having an initial viscosity of 50 Marsh-cone seconds, was poured into a mold and cured for 45 days at room temperature. The hardened mixture exhibited a coefficient of permeability of $k=1.14\times10^{-8}$ cm/sec. (less than $10^{-7}$ cm/sec.).

Whereas the previous composition was mixed for twelve minutes to achieve said viscosity, the same viscosity was achieved in 4.5 minutes using the sme apparatus by mixing the dr blend in ⅔ of the water for 3.5 minutes and mixing to the rest of the water for one minute. The above result typifies the possible enhancement of the shearing energy by concentrating the mix in a first step and diluting it in a second step to the targeted initial viscosity. Energy and time are save in following this last procedure.

While the invention has been described in several embodiments, it should be understood that these are by illustration only and that various changes and modifications with the scope of the following claims are contemplated.

It is claimed:

1. A dry blend capable of forming a self-hardening mass when reacted with an aqueous component consisting essentially of: about 15 to 55% by weight Attapulgite clay and about 85 to 45% by weight slag cement.

2. A self-hardening aqueous slurry comprising water and the dry blend of claim 1.

3. A self-hardening aqueous slurry according to claim 2 having a viscosity of about 35 to 60 Marsh-cone seconds.

4. A self-hardening aqueous slurry consisting essentially of water and in a proportion by weight of said water of about 5 to 8% of Attapulgite clay and about 7.5 to 15% of slag cement.

5. A cutoff wall comprised of the hardened aqueous slurry of claim 4.

6. A cutoff wall according to claim 5 exhibiting a permeability coefficient of less than $10^{-7}$ cm/sec.

* * * * *